(12) United States Patent
Zhang et al.

(10) Patent No.: US 10,794,840 B2
(45) Date of Patent: Oct. 6, 2020

(54) APPARATUS FOR SEMICONDUCTOR PACKAGE INSPECTION

(71) Applicant: Intel Corporation, Santa Clara, CA (US)

(72) Inventors: Liang Zhang, Chandler, AZ (US); Jianyong Mo, Chandler, AZ (US); Darren A. Vance, Gilbert, AZ (US); Di Xu, Chandler, AZ (US); Gregory S. Clemons, Gilbert, AZ (US); Robert F. Wiedmaier, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/473,777

(22) PCT Filed: Mar. 17, 2017

(86) PCT No.: PCT/US2017/023022
§ 371 (c)(1),
(2) Date: Jun. 26, 2019

(87) PCT Pub. No.: WO2018/169551
PCT Pub. Date: Sep. 20, 2018

(65) Prior Publication Data
US 2019/0339212 A1    Nov. 7, 2019

(51) Int. Cl.
*G01N 21/956* (2006.01)
*G01N 21/88* (2006.01)
(Continued)

(52) U.S. Cl.
CPC ....... *G01N 21/956* (2013.01); *G01N 21/8806* (2013.01); *G02B 3/14* (2013.01);
(Continued)

(58) Field of Classification Search
None
See application file for complete search history.

(56) References Cited

U.S. PATENT DOCUMENTS 6,630,996 B2 * 10/2003 Rao .................... G01N 21/9501
356/237.1
8,711,349 B2 * 4/2014 Gao ................... G01N 21/9501
356/237.5
(Continued)

FOREIGN PATENT DOCUMENTS

JP        2013-108779 A      6/2013

OTHER PUBLICATIONS

International Search Report and Written Opinion dated Nov. 27, 2017 for International Application No. PCT/US2017/023022, 17 pages.

*Primary Examiner* — Chikaodili E Anyikire
(74) *Attorney, Agent, or Firm* — Schwabe, Williamson & Wyatt, P.C.

(57) ABSTRACT

Embodiments of the present disclosure provide techniques and configurations for an apparatus for package inspection. In some embodiments, the apparatus may include a light source to selectively project a first light defined by a first wavelength range to a surface of a package under inspection; an optical filter to selectively transmit, within a second wavelength range, a second light emitted by the surface of the package in response to the projection of the first light to the surface; a camera to generate one or more images of the surface, defined by the second light; and a controller coupled with the light source, optical filter, and camera, to process the one or more images, to detect a presence of a material of interest on the surface of the package, based at least in part on the first and second wavelength ranges. Other embodiments may be described and/or claimed.

11 Claims, 6 Drawing Sheets

(51) Int. Cl.
*G02B 3/14* (2006.01)
*G06T 7/00* (2017.01)
*H04N 5/225* (2006.01)

(52) U.S. Cl.
CPC ........... *G06T 7/001* (2013.01); *H04N 5/2256* (2013.01); *G01N 2021/8845* (2013.01); *G01N 2201/068* (2013.01); *G06T 2207/10064* (2013.01); *G06T 2207/10152* (2013.01); *G06T 2207/30148* (2013.01)

(56) References Cited

U.S. PATENT DOCUMENTS

| | | | |
|---|---|---|---|
| 10,386,632 B2* | 8/2019 | He | G02B 27/0075 |
| 2003/0161524 A1* | 8/2003 | King | G06K 9/2018 |
| | | | 382/141 |
| 2007/0081151 A1* | 4/2007 | Shortt | G01N 21/47 |
| | | | 356/237.2 |
| 2016/0313256 A1 | 10/2016 | Sullivan et al. | |
| 2018/0007343 A1* | 1/2018 | Send | G02F 1/29 |

* cited by examiner

APPARATUS FOR SEMICONDUCTOR PACKAGE INSPECTION

CROSS REFERENCE TO RELATED APPLICATION

The present application is a national phase entry under 35 U.S.C. § 371 of International Application No. PCT/US2017/023022, filed Mar. 17, 2017, entitled "AN APPARATUS FOR SEMICONDUCTOR PACKAGE INSPECTION." PCT/US2017/023022 designated, among the various States, the United States of America. The Specification of the PCT/US2017/023022 Application is hereby incorporated by reference.

FIELD

Embodiments of the present disclosure generally relate to the field of semiconductor package fabrication and in particular to methods of inspection of semiconductor packages.

BACKGROUND

Fabrication of semiconductor packages (e.g., integrated circuits (IC)) may require high precision techniques of package layer dispensation and keeping respective surfaces clean, even, and free of extraneous materials. For example, dispensation of flux on various die regions (e.g., on the bump region of the die prior to chip to substrate bonding) may be provided to have flux coverage substantially even throughout the dispensation region. However, the currently used inspection tools may not always provide for adequate determination of flux covered areas, such as percentage of coverage of desired areas that may indicate coverage flaws.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for an apparatus for package inspection. In some embodiments, the apparatus may include a light source to selectively project a first light defined by a first wavelength range to a surface of a package under inspection; an optical filter to selectively transmit, within a second wavelength range, a second light emitted by the surface of the package in response to the projection of the first light to the surface; a camera to generate one or more images of the surface, defined at least in part by the second light; and a controller coupled with the light source, optical filter, and camera, to process the one or more images, to detect a presence of a material of interest on the surface of the package, based at least in part on the first and second wavelength ranges.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
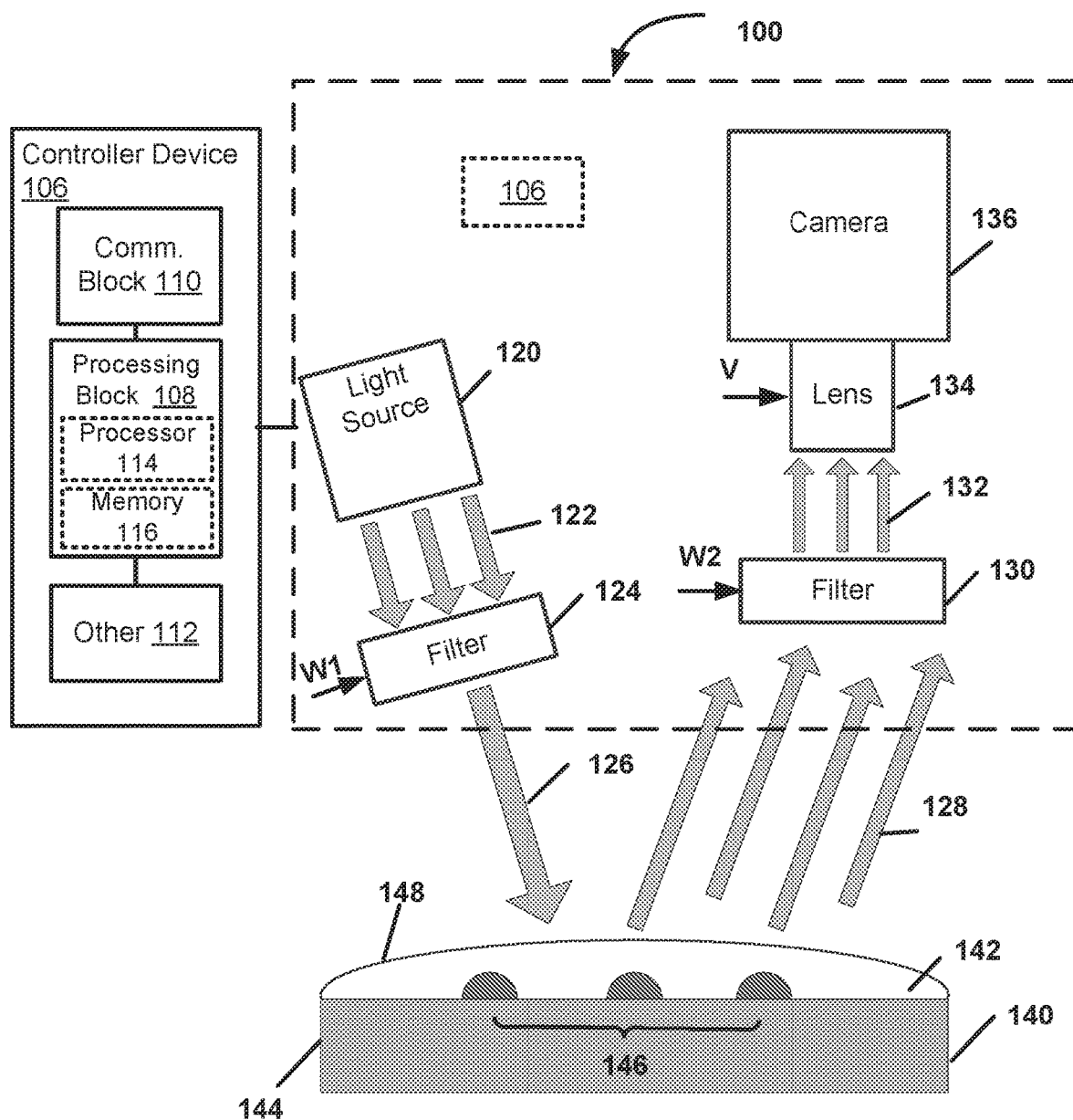
FIG. 1 illustrates an example apparatus for package inspection, in accordance with some embodiments.

FIG. 1 illustrates an example apparatus for package inspection, in accordance with some embodiments. In some embodiments described below in greater detail, the apparatus 100 may be used for inspecting a semiconductor package device, for example an integrated circuit (IC), such as a central processing unit (CPU) or a memory unit, in different stages of the package assembly. For example, the apparatus 100 may be used to detect foreign or other material on a surface of a package, such as on a substrate, using fluorescence-based detection techniques described below.

In embodiments, the apparatus 100 may include a light source 120 to project a light 122 to a surface 142 of a package under inspection 140. The light source 120 may be coupled with, or include, an optical filter 124, which may define a wavelength range, and pass on, a portion 126 of the light 122 to the surface 142. For example, the optical filter 124 may be configured to block wavelengths corresponding to white (visible) light and pass on light 126 within the wavelength range that corresponds to ultraviolet (UV) light.

The apparatus 100 may further include an optical filter 130 configured to receive light 128 emitted (e.g., reflected)

by the surface 142 of the package 140 in response to the projection of the light 126 to the surface 142. The optical filter 130 may be configured to selectively transmit, within a desired wavelength range, a portion 132 of the emitted (reflected) light 128. More generally, the reflected light from the source may be filtered and the emitted light from the target may be generated as a result of the light source 120 excitation. In other words, light 132 may comprise a reflection of a portion of light that is not absorbed by the material (e.g., disposed on the surface 142), and a portion of light that may be absorbed by the material and reemitted at a new frequency.

In embodiments, the optical filter 130 may be configured to block wavelengths corresponding to UV light and pass on white (visible) light 132. In other words, the filter 130 may be configured to pass on the light 132 within the wavelength ranges that may include fluorescing light reflected from some portions of the surface 142 that may reflect fluorescent light (e.g., material of interest). Fluorescence properties of the reflected light may be used to detect one or more materials of interest on the surface 142 of the package 140.

The apparatus 100 may further include a lens 134 configured to receive and pass on the light 132 filtered by the filter 130. The apparatus 100 may further include a camera 136 to generate one or more images of the surface 142 of the package 140. In embodiments, the lens 134 may serve to focus the camera 136 on the object (e.g., surface 142). For example, the lens 134 may comprise a liquid lens and may be controlled by voltage V applied to the lens 134, in order to adjust the focus of the camera 136.

The image of the surface 142, to be generated by the camera 136, may be defined by the portion 132 of the reflected light 128, and thus include portions of the surface 142 that may fluoresce in response to being illuminated by the UV light 126. Accordingly, controlling the wavelength ranges for excitation of the light source (e.g., controlling working frequencies of the filter 124), and controlling the wavelength ranges for passing the fluorescing light 132 by the filter 130 may allow for detection various types of organic and inorganic materials on the surface 142 of the package 140. In addition, it may be used preferentially detect one or more organic material of interest among many organic materials within the field of view in a similar method.

In embodiments, the detection of materials of interest may be operated in the following modes: detecting a material or object that may fluoresce on a non-fluorescing background (e.g., surface 142), or detecting a material or object that may not fluoresce on a fluorescing background. For example, organic materials, such as flux, typically fluoresce on a non-fluorescence background. Non-organic materials, such as metals, may not fluoresce and may be detected against a fluorescent background. Further, different materials may fluoresce with varied visibility and contrast, depending on background properties. Accordingly, different combinations of excitation and detection spectra may correspond to different types of materials to be detected. Table 1 below illustrates a few examples of combinations of wavelengths ranges for filters 124 and 130 and corresponding materials to be detected. The optical filter 124 as indicated as "Filter #1" and the optical filter 130 is indicated as "Filter #2."

| Application | Wavelength Range of Filter #1 for Excitation | Wavelength Range of Filter #2 for Fluorescence |
|---|---|---|
| Flux Inspection | 350 nm-400 nm | 410 nm-660 nm |
| Solder Resist inspection | 250 nm-300 nm | 320 nm-350 nm |
| Cu Trace Inspection | 400 nm-480 nm | 500 nm-660 nm |
| FM inspection | 350 nm-480 nm | 500 nm-660 nm |

In general, the material of interest that may be detected with apparatus 100 on the surface 142 of the package 140 may comprise a flux, solder resist, copper, epoxy, thin film, solder paste, solder, or other type of organic or non-organic material that is detectable on the surface 142 during a package 100 assembly. For example, the surface 142 of the package 140 may be a surface of a substrate 144, and include a region of interest 146 (e.g., bump region), which may be covered (e.g., fully, partially, substantially evenly or unevenly, or the like) by a material of interest 148, such as flux.

In embodiments, the apparatus 100 may be operated by a computing device. In some embodiments, the computing device (e.g., a controller device 106) may be communicatively coupled with the apparatus 100, as shown in FIG. 1. In some embodiments, the computing device (controller device 106) may be embedded with the apparatus 100, as schematically shown in dotted lines inside the apparatus 100 in FIG. 1. The controller device 106 may be coupled with the light source 120, optical filters 124 and 130, lens 134, and camera 136, to process one or more images of the surface 142, generated (captured) by the camera 136, to detect a presence of a material of interest on the surface 142 of the package 140.

For example, the controller device 106 may be configured to control the wavelength ranges of the filters 124 and 130. For example, the controller device 106 may be configured to tune the optical filter 124 to have the light 126 be projected at a particular excitation wavelength range W1. The controller device 106 may be configured to tune the optical filter 130 to transmit the light 132 at the wavelength range W2 that may correspond to the fluorescence wavelength range (as shown in Table 1). Accordingly, the controller device 106 may control the filters 124 and 130 to provide for detection of a particular material of interest that may correspond to a particular combination of wavelength ranges W1 and W2.

The controller device 106 may be further configured to operate the camera 136, to cause image acquisition, and to control the lens 134, e.g., by adjusting voltage V applied to the lens 134. In other words, the controller device 106 may autofocus the camera 136 on the object (package under inspection), e.g., automatically bring the package under inspection to focus. Commonly, objects may be brought to focus by moving the camera and/or the objects, or controlling the lens focal length using a motor, which may requires a motion stage or the like. By using a liquid lens, a motion stage may be eliminated, and objects may be brought to focus by controlling the voltage to the liquid lens. The focal length of the liquid lens depends on the applied electrical voltage. Since it is much faster to control an electrical signal as compared to mechanical motion, using a liquid lens may auto-focus objects much faster compared to the traditional motion-stage methods as mentioned above.

In embodiments, the controller device 106 may comprise a processing block 108, to control the apparatus 100, and communication block 110, to communicate data associated with image processing.

The processing block 108 may comprise at least a processor 120 and memory 122. The processing block 108 may include components configured to control the apparatus 100 and process the images of surfaces of packages under inspection. The processing block 108 may provide these components through, for example, a plurality of machine-readable instructions stored in the memory 122 and executable on the processor 120. For example, the processing block 108 may execute a control program for package inspection that may be based on LabVIEW® integrated development environment.

The processor 120 may include, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors including those in the Pentium®, Xeon®, Itanium®, Celeron®, Atom®, Quark®, Core® product families, or the like.

Examples of support circuitry may include host side or input/output (I/O) side chipsets (also known as northbridge and southbridge chipsets/components) to provide an interface through which the processor 120 may interact with other system components that may be operating at different speeds, on different buses, etc. in the controller device 106. Some or all of the functionality commonly associated with the support circuitry may also be included in the same physical package as the processor.

The memory 122 may comprise random access memory (RAM) or read-only memory (ROM) in a fixed or removable format. RAM may include volatile memory configured to hold information during the operation of device 106 such as, for example, static RAM (SRAM) or Dynamic RAM (DRAM). ROM may include non-volatile (NV) memory circuitry configured based on basic input/output system (BIOS), Unified Extensible Firmware Interface (UEFI), etc. to provide instructions when the controller device 106 is activated, programmable memories such as electronic programmable ROMs (erasable programmable read-only memory), Flash, etc. Other fixed/removable memory may include, but is not limited to, electronic memories such as solid state flash memory, removable memory cards or sticks, etc.

The communication block 110 may include one or more radios capable of transmitting and receiving signals using various suitable wireless communications techniques. The controller device 106 may include other components 112 that may be necessary for functioning of the apparatus 100. Other components 112 may include, for example, hardware and/or software to allow users to interact with the controller device 106 and with apparatus 100 such as, for example, various input mechanisms (e.g., microphones, switches, buttons, knobs, keyboards, speakers, touch-sensitive surfaces, etc.) and various output mechanisms (e.g., speakers, displays, lighted/flashing indicators, etc.). The hardware in other components 112 may be incorporated within the controller device 106 and/or apparatus 100 and/or may be coupled to the controller device 106 via a wired or wireless communication medium.

Figure 2:
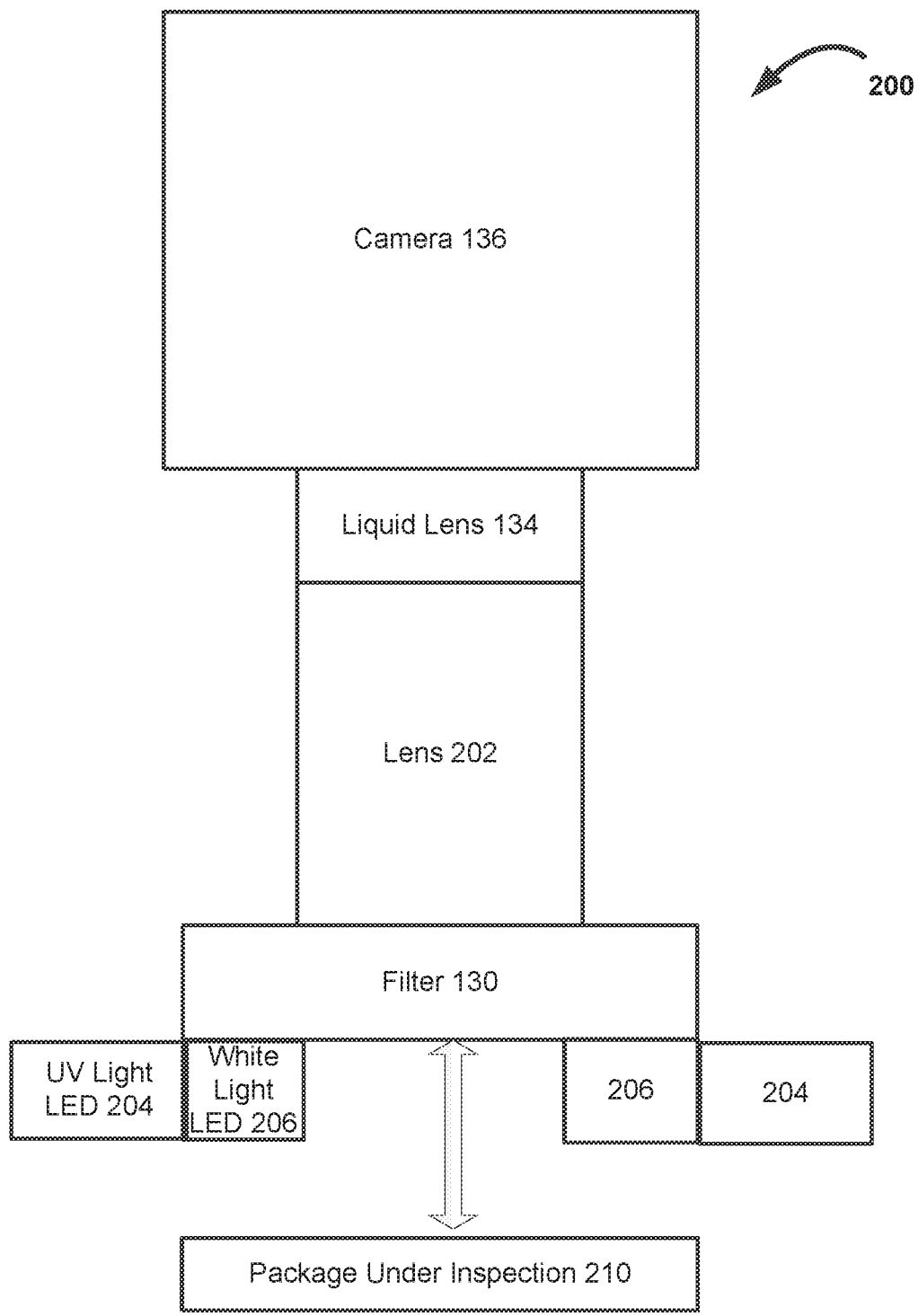
FIG. 2 illustrates an example embodiment of an apparatus for package inspection, in accordance with some embodiments.

FIG. 2 illustrates an example embodiment of an apparatus for package inspection, in accordance with some embodiments. For ease of understanding, like components of apparatuses of FIGS. 1 and 2 are identified by like numerals. As shown, the apparatus 200 may include the camera 136 coupled with the liquid lens 134, similar to the arrangement of FIG. 1. The camera 136 may comprise a high resolution and small form factor camera, for example, providing about 10 um pixel resolution. The liquid lens 134 may be used for focusing the camera 136 without having to physically move the camera or the lens, as described in reference to FIG. 1. The liquid lens 134 may be coupled with a lens 202, provided for enlarging the field of view of the camera. In embodiments, the lens may have about 35 mm diameter or similar size.

The apparatus 200 may further include a UV light source (e.g., light emitting diode (LED)) 204 disposed substantially around the lens 202, to provide for excitation of the fluorescent light reflected off the package under inspection 210. The apparatus 200 may further include a white light source (e.g., LED) 206, which may be used for other inspection purposes. As shown, the white light source 206 may be disposed around the lens 202, and the UV light source 204 may be disposed around the white light source 206. The white light source 206 may be used for a two-dimensional bar code (2D ID) read and alignment procedure in the package assembly. The apparatus 200 described above have a number of advantages compared to conventional solutions. For example, the apparatus 200, having liquid lens 134 with adjustable focus, may not need a vertical stage for focus, and the removal of a vertical stage may make the apparatus 200 a more compact system, and may provide sufficient space to mount it in the existing equipment footprint. This improvement may provide considerable cost savings, compared to conventional larger and bulkier system.

The high resolution camera 136 may enable the large field of view for the whole controlled collapse chip connection (C4) bump area of a package under inspection. UV LED has capability to give high contrast fluorescence image to measure flux coverage. The apparatus 200 as described may provide for detection of flux, epoxy, solder resist (SR), Ajinomoto build-up films (ABF) and foreign materials in die attach process, ball attach process, and other assembly process steps that require inspection in any equipment such as material handling, inspection, metrology, or assembly tools.

Figure 3:
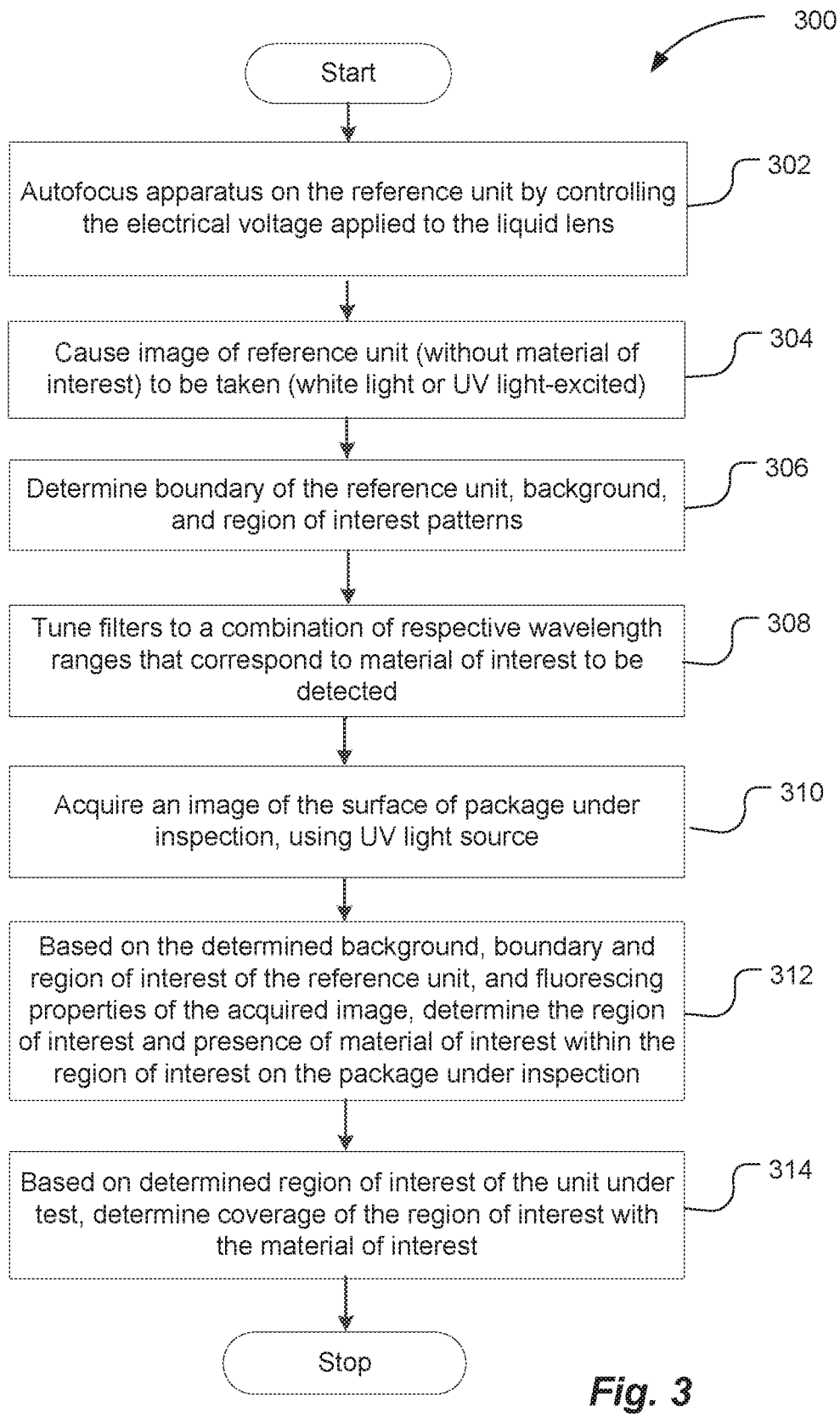
FIG. 3 is an example process flow diagram for inspecting a package with an apparatus for package inspection, in accordance with some embodiments.

FIG. 3 is an example process flow diagram for inspecting a package with an apparatus for package inspection, in accordance with some embodiments. The process 300 may comport with embodiments of the apparatus for package inspection described in reference to FIGS. 1-2 of this disclosure. In embodiments, the process 300 may be performed by a computing device (e.g., controller device 106 of FIG. 1).

The process 300 may begin at block 302 and include autofocusing the apparatus for package inspection on the reference unit by controlling the electrical voltage applied to the liquid lens.

At block 304, the process 300 may include causing image of reference unit (without material of interest) to be taken, using white light source or UV light source. It should be noted that the reference unit may typically be almost identical in dimensions to the other units under inspection. In some instances, the reference unit image may be taken under white light or UV light. In some embodiments, the reference unit image may be taken under white light and under UV light, e.g., comprising two images altogether.

At block 306, the process 300 may include determining a boundary of the reference unit, background, and a pattern corresponding to a region of interest (e.g., C4 bump area), based on the acquired image of the reference unit. The units (e.g., reference unit and units or packages under inspection) may not always have a perfect rectangular shape due to large lens distortion of liquid lens or possible varied field of view (FOV) after lens refocus. The bump area distribution on unit may be impacted by such distortion. In summary, different units (packages) under inspection may have somewhat different shapes.

In embodiments, the blob analysis of the reference unit image may be used. For example, thresholding of image histogram and fiducial detection may be used to locate the unit corner and boundary, and then segment it out from the background. A segmentation may also be done on the region of interest (e.g., C4 bump area) out of the substrate of the reference unit. The template region information may be saved as a unit recipe.

Figure 4:
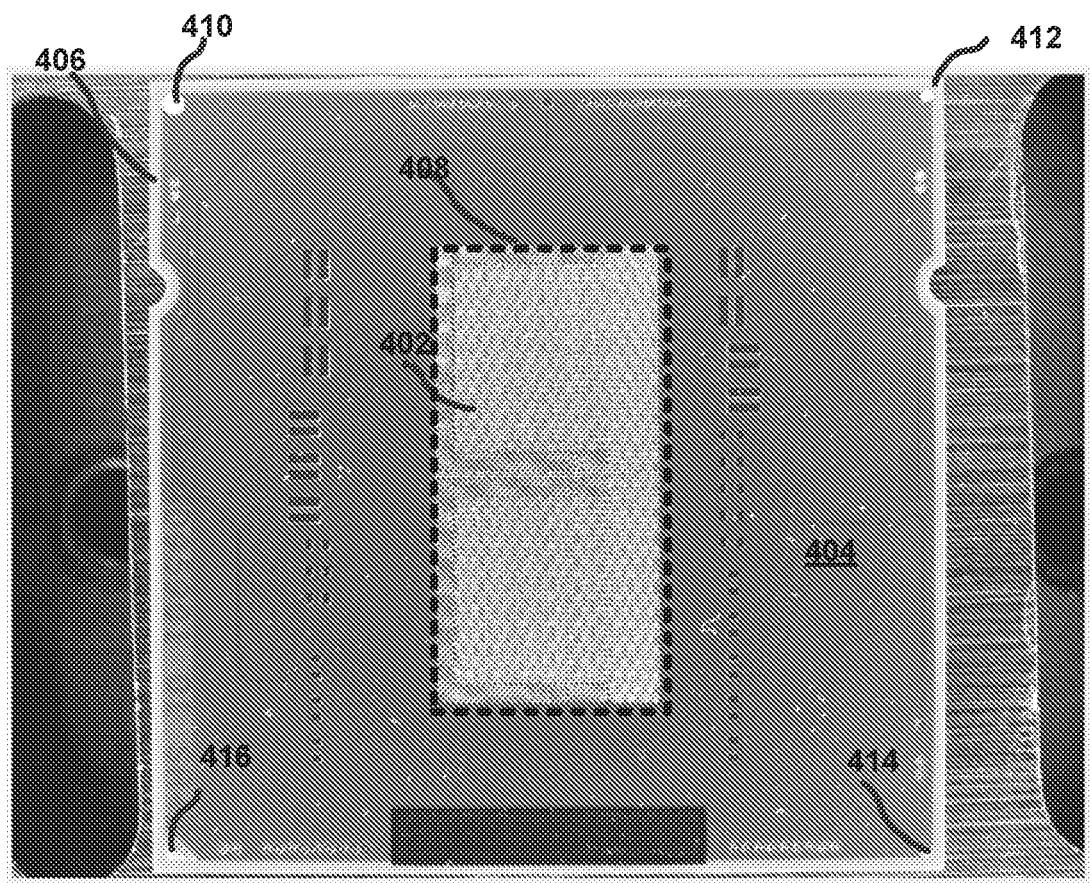
FIGS. 4 and 5 illustrate example images of the reference unit provided with the apparatus of FIG. 1, in accordance with some embodiments.
Figure 5:
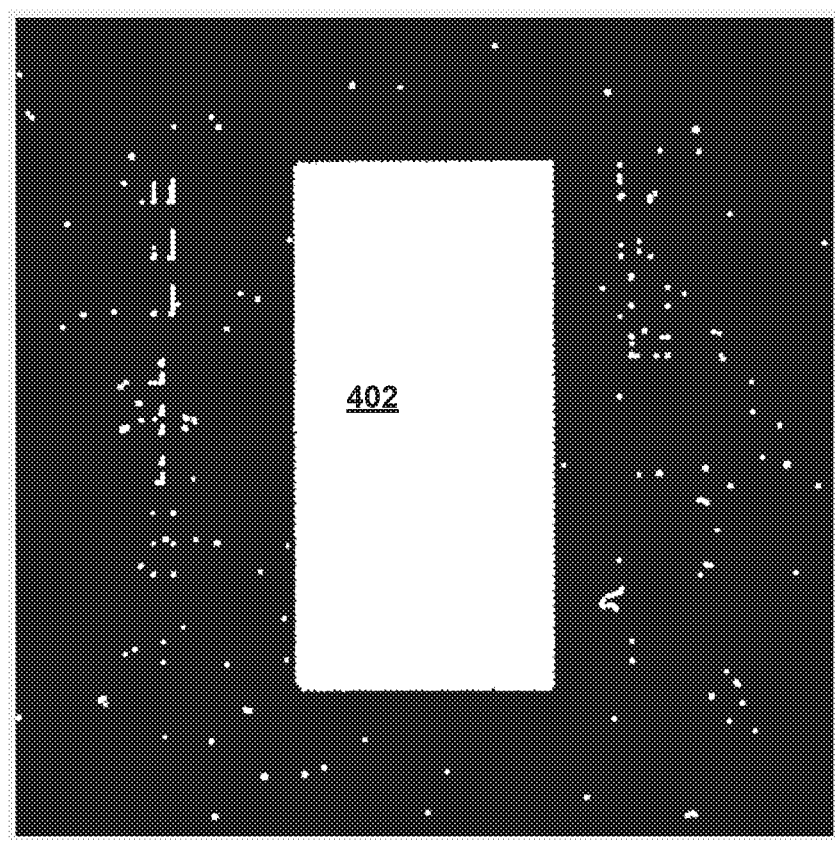

FIGS. 4 and 5 illustrate example images of the reference unit provided with the apparatus of FIG. 1, in accordance with some embodiments. FIG. 4 illustrates an example reference unit image, in which the region of interest 402 is visible on background 404. FIG. 5 illustrates the example reference unit image with extracted region of interest 402.

In some embodiments, fiducials pattern matching may be used between a reference image and images of packages under inspection, to calculate the transform matrix and apply affine transform of the patterns, and then calculate the bump area. The fiducial pattern may also be saved into a unit recipe once it is created.

At block 308, the process 300 may include tuning the optical filter associated with the light source and the optical filter associated with the camera to a combination of respective wavelength ranges that correspond to material of interest to be detected.

At block 310, the process 300 may include acquiring an image of the surface of package under inspection, using UV light source. The fluorescence light may be emitted by the material of interest (e.g., organic material) after absorbing UV photons.

At block 312, the process 300 may include determining the region of interest and presence of material of interest within the region of interest on the package under inspection, based at least in part on the determined background, boundary and region of interest of the reference unit, and fluorescing properties of the acquired image of the package under inspection. For example, the reference image may be used to crop out the bare bump image as background image. Also, the pattern matching of fiducials may be used and affine transform maybe applied on the region template to find the bump area (region of interest) on the package under inspection. Then the bump image may be cropped out of new sample as foreground.

Figures 6, 7, 8:
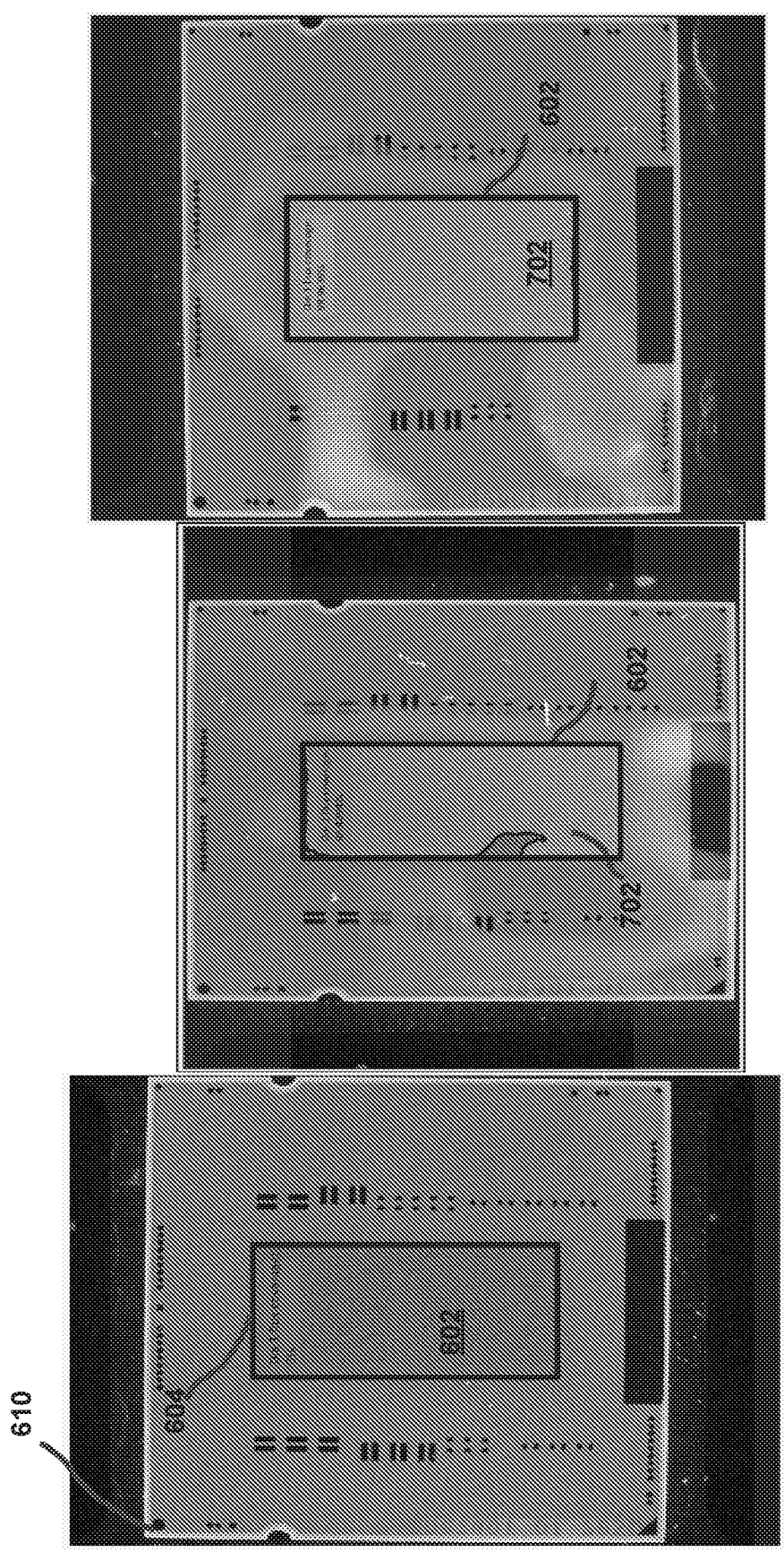
FIGS. 6-9 illustrate example images of a package under inspection provided with the apparatus of FIG. 1, in accordance with some embodiments.

More specifically, the field of view of a typical image (shown in FIG. 4) may be bigger than the size of unit under inspection, which is marked by line 406. The region of interest is marked by dotted line 408. Since the UV image (FIG. 6) may not provide a clear C4 bump area boundary, the C4 bump area may be located based on the image taken under white light illumination (e.g., FIG. 4). Once the C4 bump area (the region location and dimensions) on the reference image (FIG. 4), is found, this area may be found in the UV image (FIG. 6). Since those two images could have different field of view (e.g., different magnifications) this may lead to different sizes appearing on the image. In addition, the units in these two images may rotate and/or shift relative to each other. Accordingly, a 1:1 transfer of the C4 bump area found in the reference image (FIG. 4) to the UV image (FIG. 6) may not always be possible.

In embodiments, affine transform may be used to compensate the difference in magnification, translation and rotation, as well as lens distortion. To execute affine transform, recognizable landmarks, such as the fiducials (e.g., 410, 412, 414, 416), may be used. The fiducials on the reference unit and unit (package) under inspection may be almost identical and may be visible in both images (see, e.g., 610 in FIG. 6). The fiducials on the two images may be pattern matched, which may result in the affine transformation matrix. After the affine transformation, the C4 bump area found in the reference image (area marked by 408 in FIG. 4) may correspond to the C4 bump area in the UV image (area marked by line 604 in FIG. 6).

At block 314, the process 300 may include determining coverage of the region of interest with the material of interest, based on determined region of interest of the unit under test. The coverage percentage may be determined as a ratio of the area of the material of interest to the area of the region of interest.

FIGS. 6-8 illustrate example images of a package under inspection provided with the apparatus of FIG. 1, in accordance with some embodiments. More specifically, as described above, FIG. 6 illustrates an example image of the package with no material of interest (e.g., flux) coverage of the region of interest 602 (e.g., UV image of the C4 bump region). FIG. 7 illustrates an example image of the package with partial coverage of the region of interest 602 by material of interest 702 (e.g., flux). FIG. 8 illustrates an example image of the package with full coverage of the region of interest 602 by material of interest 702. Note that the images were taken at different unit orientation and camera field of view.

The described embodiments provide for the inspection of the coverage of materials of interest in a certain region of interest (e.g., C4 bump area of the package), where the materials are supposed to be. For example, the described embodiments provided examples of fluorescing flux in non-fluorescing C4 bump background, which is an organic material on a non-organic background.

Figure 9:
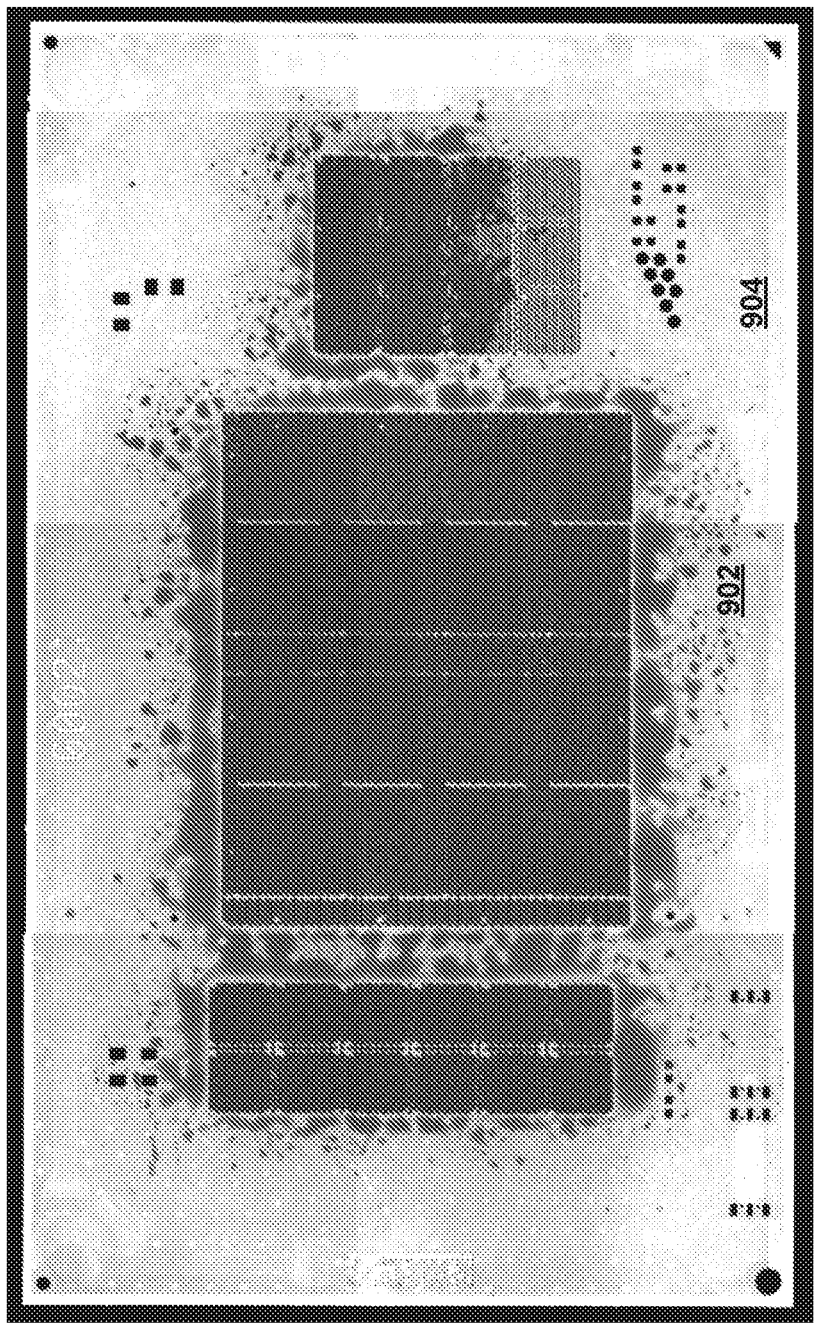

FIG. 9 illustrates an example image of the package, in accordance with some embodiments. In the image of FIG. 9, non-fluorescing materials (e.g., dots marked by line 902) may be detected on a fluorescing background 904. In this case, the flux 902 is dark, and is not fluorescing. The bright background 904 is due to the fluorescing solder resist. Accordingly, by choosing excitation and detection spectra (filters 124 and 130 described in reference to FIG. 1) flux 902 may be inspected on top of solder resist 904.

In the embodiments described above, fluorescing flux may be detected on the non-fluorescing C4 bump region. In the embodiments of FIG. 9, non-fluorescing flux may be detected on the fluorescing background. Detections in either case are possible because the excitation and detection spectra (two filters 124 and 130) are different for each example. In other words, by carefully choosing the two filters (and corresponding wavelength ranges), presence of many different materials may be detected on various backgrounds. As described above, the same material (e.g., flux) may be fluorescing or non-fluorescing under different conditions (different excitation and detection wavelength ranges).

In some embodiments, the described embodiments may provide for inspection of the presence or absence of the materials of interest in certain regions of interest, where these materials are not supposed to be or are not expected to be.

The embodiments described herein may be further illustrated by the following examples.

Example 1 may be an apparatus for package inspection, comprising: a light source to selectively project a first light defined by a first wavelength range to a surface of a package under inspection; an optical filter to selectively transmit, within a second wavelength range, a second light emitted by the surface of the package in response to the projection of the first light to the surface; a camera to generate one or more images of the surface, defined at least in part by the second light; and a controller coupled with the light source, optical filter, and camera, to process the one or more images, to detect a presence of a material of interest on the surface of the package, based at least in part on the first and second wavelength ranges.

Example 2 may include the apparatus of example 1, wherein the apparatus further comprises a lens coupled with the controller, wherein the controller is to adjust the lens, to focus the camera on the surface for image generation.

Example 3 may include the apparatus of example 2, wherein the lens comprises a liquid lens, wherein to adjust the lens includes to control voltage applied to the liquid lens.

Example 4 may include the apparatus of example 1, wherein the controller is to cause the camera to generate the image defined at least in part by the second light.

Example 5 may include the apparatus of example 1, wherein the controller is to control the first and second wavelength ranges, wherein to control includes to: tune the light source to project the first light at the first wavelength range; and tune the optical filter to transmit the second light at the second wavelength.

Example 6 may include the apparatus of example 5, wherein the detectability of the material of interest from the image of the surface is based on a combination of the first and second wavelength ranges of the first and second lights respectively.

Example 7 may include the apparatus of example 1, wherein the first wavelength range is within a range that defines ultraviolet (UV) light wavelength.

Example 8 may include the apparatus of example 7, wherein the second wavelength range is within a range that defines fluorescent light wavelength.

Example 9 may include the apparatus of example 8, wherein the package surface comprises a surface of a substrate, wherein the material of interest is to be selected from: a flux, solder resist, copper, epoxy, thin film, solder paste, solder, or other type of organic or non-organic material that is detectable on the surface of the substrate during a package assembly.

Example 10 may include the apparatus of any examples 1 to 9, wherein the controller to process the one or more images includes to: cause the camera to generate a first image of a reference unit having a surface that is free from the material of interest; cause the camera to generate a second image of the package under inspection, wherein the first wavelength range is within a range that defines ultraviolet (UV) light wavelength, and the second wavelength range is within a range that defines fluorescent light; and identify the material of interest on the surface of the package, based at least in part on the first and second images.

Example 11 may include the apparatus of example 10, wherein the controller to identify the material of interest on the surface of the package includes to identify a region of interest on the surface of the package, based at least in part on the first and second images.

Example 12 may include the apparatus of example 10, wherein the controller is further to identify a boundary of the surface of the package, and determine a background of the surface of the package.

Example 13 may be a method, comprising: causing a light source of an apparatus to selectively project a first light defined by a first wavelength range to a surface of a package under inspection; causing a camera of the apparatus to acquire one or more images of the surface, formed by a second light emitted by the surface of the package in response to the projection of the first light to the surface and filtered to a second wavelength range that is different than the first wavelength range; and processing the one or more images, including detecting a presence of a material of interest on the surface of the package, based at least in part on the first and second wavelength ranges.

Example 14 may include the method of example 13, further comprising: causing a lens of the apparatus to filter the second light at the second wavelength range.

Example 15 may include the method of example 13, further comprising: tuning the light source to project the first light at the first wavelength range; and tuning the optical filter to transmit the second light at the second wavelength, wherein a combination of the first and second wavelength ranges corresponds to the material of interest to be detected.

Example 16 may include the method of any of examples 13 to 15, wherein the first wavelength range is within a range that defines an ultraviolet (UV) light wavelength, wherein the second wavelength range is within a range that defines a fluorescent light wavelength, wherein processing one or more images includes: causing the camera to acquire a first image of a surface of a reference unit, wherein the surface is free from the material of interest; causing the camera to acquire a second image of the surface of the package under inspection; and processing data associated with the first and second images, to detect the presence of the material of interest on the surface of the package.

Example 17 may include the method of example 16, wherein processing data includes: determining a background of the first image; identifying a boundary of the reference unit, based on the first image; and determining a pattern corresponding to a region of interest, based on the first image.

Example 18 may include the method of example 17, further comprising: determining a region of interest on the surface of the package, based on the first and second images; identifying an area of the region of interest that is covered with the material of interest, based at least in part on a result of the determining; and calculating a measure of coverage of the area of the region of interest with the material of interest, based at least in part on results of the determining and identifying.

Example 19 may be an apparatus for package inspection, comprising: a light source to project ultraviolet (UV) light to a surface of a package under inspection; an optical filter to pass on, at a determined wavelength, a light emitted by the surface; and a camera, to generate an image of the surface of the package, based on the second portion of the emitted light that is to be passed on by the optical filter.

Example 20 may include the apparatus of example 19, further comprising a computing device coupled with the light source optical filter, and camera, to: control a wavelength of the UV light projected by the light source; control the wavelength of the emitted light; cause the camera to generate the image of the surface of the package; and process the one or more images, to detect a presence of a material of interest on the surface of the package.

Example 21 may include the apparatus of example 19, wherein a type of material of interest to be detected is defined by a combination of the wavelength of the UV light projected by the light source and the wavelength of the emitted light.

Example 22 may include the apparatus of any examples 19 to 21, further comprising a liquid lens, wherein the controller is to control voltage applied to the liquid lens, to focus the camera on the surface of the package.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus for package inspection, comprising:
a camera, to generate one or more images of a surface of a package under inspection;
a liquid lens coupled with the camera, to focus the camera on the surface of the package under inspection;
a lens coupled with the liquid lens, to enlarge a field of view of the camera;
a ultra-violet (UV) light source disposed around the lens, to selectively project a first light defined by a first wavelength range to a surface of a package under inspection;
a white light source disposed around the lens, adjacent to the UV light source, to provide for reading of a two-dimensional bar code and alignment of the package under inspection with the apparatus;
an optical filter to selectively transmit, within a second wavelength range, a second light emitted by the surface of the package in response to the projection of the first light to the surface, wherein the camera is to generate the one or more images of the surface, defined at least in part by the second light; and
a controller coupled with the UV and white light sources, lens, liquid lens, optical filter, and camera, to control the liquid lens to focus the camera, and to process the one or more images, to detect a presence of a material of interest on the surface of the package, based at least in part on the first and second wavelength ranges, wherein the apparatus is free from a vertical stage for focusing the camera on the surface of the package under inspection, and is mountable within an existing equipment footprint.

2. The apparatus of claim 1, wherein to control the liquid lens includes to control voltage applied to the liquid lens.

3. The apparatus of claim 1, wherein the controller is to cause the camera to generate the image defined at least in part by the second light.

4. The apparatus of claim 1, wherein the controller is to control the first and second wavelength ranges, wherein to control includes to:
tune the UV light source to project the first light at the first wavelength range; and
tune the optical filter to transmit the second light at the second wavelength range.

5. The apparatus of claim 4, wherein the detectability of the material of interest from the image of the surface is based on a combination of the first and second wavelength ranges of the first and second lights respectively.

6. The apparatus of claim 1, wherein the first wavelength range is within a range that defines UV light wavelength.

7. The apparatus of claim 6, wherein the second wavelength range is within a range that defines fluorescent light wavelength.

8. The apparatus of claim 7, wherein the package surface comprises a surface of a substrate, wherein the material of interest is to be selected from: a flux, solder resist, copper, epoxy, thin film, solder paste, solder, or other type of organic or non-organic material that is detectable on the surface of the substrate during a package assembly.

9. The apparatus of claim 1, wherein the controller to process the one or more images includes to:
cause the camera to generate a first image of a reference unit having a surface that is free from the material of interest;
cause the camera to generate a second image of the package under inspection, wherein the first wavelength range is within a range that defines UV light wavelength, and the second wavelength range is within a range that defines fluorescent light; and
identify the material of interest on the surface of the package, based at least in part on the first and second images.

10. The apparatus of claim 9, wherein the controller to identify the material of interest on the surface of the package includes to identify a region of interest on the surface of the package, based at least in part on the first and second images.

11. The apparatus of claim 9, wherein the controller is further to identify a boundary of the surface of the package, and determine a background of the surface of the package.

* * * * *